(12) United States Patent
Yu (10) Patent No.: US 10,025,112 B2
(45) Date of Patent: Jul. 17, 2018

(54) STEREOSCOPIC DISPLAY DEVICE WITH PATTERNED RETARDER AND METHOD FOR DRIVING THE SAME

(75) Inventor: Seung-Woo Yu, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 745 days.

(21) Appl. No.: 13/306,623

(22) Filed: Nov. 29, 2011

(65) Prior Publication Data

US 2012/0147138 A1 Jun. 14, 2012

(30) Foreign Application Priority Data

Dec. 10, 2010 (KR) ........................ 10-2010-0126255

(51) Int. Cl.
*H04N 13/339* (2018.01)
*G02B 27/26* (2006.01)
(Continued)

(52) U.S. Cl.
CPC ........... *G02B 27/26* (2013.01); *H04N 13/133* (2018.05); *H04N 13/337* (2018.05)

(58) Field of Classification Search
CPC ........... H04N 13/0048; H04N 13/0438; H04N 13/0029; H04N 9/8205; H04N 13/0055; H04N 13/0454; H04N 19/597; H04N 13/0011; H04N 13/0059; H04N 13/0497; H04N 13/026; H04N 13/0066; H04N 13/0434; H04N 13/0018; H04N 13/0025; H04N 2213/008; H04N 13/0422; H04N 13/0022; H04N 13/044; H04N 13/0409; H04N 13/0429; H04N 2013/0077; G09G 2320/0666; G09G 5/02; G09G 2340/06; G09G 5/06; G09G 2320/0626; G09G 3/2003; G09G 2320/0285; G09G 3/003; (Continued)

(56) References Cited

U.S. PATENT DOCUMENTS 7,180,554 B2 *  2/2007  Divelbiss ............. G02B 26/008
                                                       345/6
8,116,369 B2 *  2/2012  Choi et al. ............... 375/240.01
(Continued)

FOREIGN PATENT DOCUMENTS

CN        1737641 A      2/2006
CN      101060641 A     10/2007
(Continued)

*Primary Examiner* — Dave Czekaj
*Assistant Examiner* — Kehinde O Abimbola
(74) *Attorney, Agent, or Firm* — Birch, Stewart, Kolasch & Birch, LLP (57) ABSTRACT

A stereoscopic display device includes a 3D formatter for aligning a left eye image data and a right eye image data received from an outside of the stereoscopic display device in an interlaced method and forwarding the same, a data compensating unit for selecting a compensation data on the left eye image data and the right eye image data received from the 3D formatter from a compensation look-up table having the compensating data on the left eye image data and the right eye image data on each gray scale preset thereon, and compensating the left eye image data and the right eye image data, and a panel driving unit for displaying the left eye image data and the right eye image data from the data compensating unit on a display unit alternately in lines.

4 Claims, 8 Drawing Sheets

(51) Int. Cl.
*H04N 13/337* (2018.01)
*H04N 13/133* (2018.01)

(58) Field of Classification Search
CPC ..... G09G 2320/0233; G09G 2360/144; G09G 2320/0252; G09G 2320/0209; G09G 2320/0693
See application file for complete search history.

(56) References Cited

U.S. PATENT DOCUMENTS

| | | | | |
|---|---|---|---|---|
| 8,493,434 | B2* | 7/2013 | Broberg | H04N 13/0029 348/43 |
| 8,605,138 | B2* | 12/2013 | Son et al. | 348/51 |
| 8,633,974 | B2* | 1/2014 | Kang | 348/58 |
| 8,675,054 | B2 | 3/2014 | Jung | |
| 8,704,883 | B2* | 4/2014 | Lee | G02B 27/225 348/42 |
| 9,066,094 | B2* | 6/2015 | Nakahata | G09G 3/003 |
| 2003/0112507 | A1* | 6/2003 | Divelbiss | G02B 26/008 359/464 |
| 2004/0252756 | A1* | 12/2004 | Smith et al. | 375/240.01 |
| 2006/0114317 | A1 | 6/2006 | Yuuki et al. | |
| 2006/0153289 | A1* | 7/2006 | Choi et al. | 375/240.01 |
| 2007/0290964 | A1* | 12/2007 | Yang | G09G 3/3648 345/87 |
| 2009/0009508 | A1 | 1/2009 | Koo et al. | |
| 2009/0115773 | A1* | 5/2009 | Wu | G09G 3/3611 345/214 |
| 2009/0122134 | A1* | 5/2009 | Joung et al. | 348/42 |
| 2010/0060721 | A1* | 3/2010 | Chen et al. | 348/51 |
| 2010/0220178 | A1 | 9/2010 | Takahashi et al. | |
| 2010/0225750 | A1* | 9/2010 | Nakahata et al. | 348/56 |
| 2010/0231697 | A1* | 9/2010 | Nakahata et al. | 348/56 |
| 2010/0231698 | A1* | 9/2010 | Nakahata et al. | 348/56 |
| 2010/0245400 | A1* | 9/2010 | Nakahata | G09G 3/003 345/690 |
| 2011/0012990 | A1* | 1/2011 | Broberg | H04N 13/0029 348/43 |
| 2011/0080465 | A1* | 4/2011 | Kim et al. | 348/43 |
| 2011/0090308 | A1* | 4/2011 | Chen et al. | 348/43 |
| 2011/0090319 | A1* | 4/2011 | Kim | G09G 3/003 348/51 |
| 2011/0090321 | A1* | 4/2011 | Nakagawa | G09G 3/003 348/51 |
| 2011/0149052 | A1* | 6/2011 | Bai | H04N 13/0438 348/54 |
| 2011/0193947 | A1* | 8/2011 | Chen | 348/56 |
| 2011/0205335 | A1* | 8/2011 | Kim | H04N 13/0497 348/43 |
| 2011/0216177 | A1* | 9/2011 | Chae | H04N 13/04 348/57 |
| 2011/0267439 | A1* | 11/2011 | Chen et al. | 348/53 |
| 2011/0273439 | A1* | 11/2011 | Son et al. | 345/419 |
| 2012/0019514 | A1* | 1/2012 | Chao | G09G 3/003 345/419 |
| 2012/0019515 | A1* | 1/2012 | Chao | G09G 3/003 345/419 |
| 2012/0033039 | A1* | 2/2012 | Sasaki et al. | 348/43 |
| 2012/0050502 | A1* | 3/2012 | Chi et al. | 348/51 |
| 2012/0086706 | A1* | 4/2012 | Lee | G02B 27/225 345/419 |
| 2012/0092466 | A1* | 4/2012 | Choi | H04N 13/0477 348/51 |
| 2013/0278721 | A1* | 10/2013 | Broberg | H04N 13/0029 348/43 |

FOREIGN PATENT DOCUMENTS

| | | |
|---|---|---|
| CN | 101398608 A | 4/2009 |
| CN | 101888564 A | 11/2010 |
| CN | 101895778 A | 11/2010 |
| CN | 102244797 A | 11/2011 |
| JP | 2010-200213 A | 9/2010 |

* cited by examiner

FIG. 1

Δ(A-ideal) = +3.4 (A: Actual measurement)

| Pattern | | Brightness (Left-glasses) | | Gray To Gray 3D Crosstalk(%) |
|---|---|---|---|---|
| Left (Current) | Right (Prev.) | without glasses(2D) | with glasses(3D) | with glasses(3D) |
| 255 | 255 | 451.6 | 182.4 | - |
| 255 | 191 | 366.0 | 181.9 | 0.72% |
| 255 | 127 | 290.3 | 181.3 | 0.85% |
| 255 | 63 | 240.0 | 181.0 | 0.82% |
| 255 | 0 | 225.5 | 180.8 | 0.88% |
| 191 | 255 | 365.0 | 113.3 | 4.99% |
| 191 | 191 | 271.7 | 109.7 | - |
| 191 | 127 | 194.7 | 107.9 | 2.98% |
| 191 | 63 | 145.6 | 106.0 | 3.76% |
| 191 | 0 | 129.5 | 103.5 | 5.68% |
| 127 | 255 | 288.7 | 52.5 | 3.11% |
| 127 | 191 | 193.8 | 49.4 | 1.70% |
| 127 | 127 | 119.4 | 48.4 | - |
| 127 | 63 | 71.6 | 47.0 | 3.75% |
| 127 | 0 | 56.6 | 45.1 | 6.72% |
| 63 | 255 | 238.0 | 12.4 | 1.20% |
| 63 | 191 | 143.9 | 11.2 | 0.92% |
| 63 | 127 | 71.0 | 10.8 | 1.12% |
| 63 | 63 | 25.6 | 10.4 | - |
| 63 | 0 | 12.2 | 9.7 | 6.52% |
| 0 | 255 | 223.6 | 0.8 | 0.41% |
| 0 | 191 | 127.8 | 0.5 | 0.41% |
| 0 | 127 | 55.8 | 0.3 | 0.41% |
| 0 | 63 | 12.0 | 0.1 | 0.41% |
| 0 | 0 | 0.2 | 0.1 | - |
| AVE. | | | | 2.37% |

FIG. 5B

| Pattern | | Brightness (Left-glasses) | | Gray To Gray 3D Crosstalk(%) |
|---|---|---|---|---|
| Left (Current) | Right (Prev.) | without glasses(2D) | with glasses(3D) | with glasses(3D) |
| 255 | 255 | 450.6 | 182.1 | - |
| 255 | 191 | 365.7 | 181.7 | 0.59% |
| 255 | 127 | 287.6 | 181.2 | 0.69% |
| 255 | 63 | 238.3 | 181.0 | 0.65% |
| 255 | 0 | 224.9 | 181.2 | 0.50% |
| 191 | 255 | 366.3 | 114.4 | 1.75% |
| 191 | 191 | 279.4 | 113.2 | - |
| 191 | 127 | 201.0 | 112.1 △ 4.2 | 1.75% |
| 191 | 63 | 150.9 | 110.8 | 2.35% |
| 191 | 0 | 137.4 | 110.2 | 2.66% |
| 127 | 255 | 288.2 | 51.7 | 1.22% |
| 127 | 191 | 200.6 | 50.5 | 0.56% |
| 127 | 127 | 123.8 | 50.1 | - |
| 127 | 63 | 74.3 | 49.3 | 2.18% |
| 127 | 0 | 60.7 | 48.7 | 2.83% |
| 63 | 255 | 238.5 | 11.7 | 0.68% |
| 63 | 191 | 150.4 | 11.0 | 0.48% |
| 63 | 127 | 74.1 | 10.8 | 0.52% |
| 63 | 63 | 26.1 | 10.6 | - |
| 63 | 0 | 12.9 | 10.3 | 2.78% |
| 0 | 255 | 225.2 | 0.9 | 0.43% |
| 0 | 191 | 136.7 | 0.6 | 0.42% |
| 0 | 127 | 60.3 | 0.3 | 0.43% |
| 0 | 63 | 12.8 | 0.1 | 0.43% |
| 0 | 0 | 0.2 | 0.1 | - |
| AVE. | | | | 1.20% |

STEREOSCOPIC DISPLAY DEVICE WITH PATTERNED RETARDER AND METHOD FOR DRIVING THE SAME

CROSS REFERENCE TO RELATED APPLICATION

This application claims the benefit of the Korean Patent Application No. 10-2010-0126255, filed on Dec. 10, 2010, which is hereby incorporated by reference as if fully set forth herein.

BACKGROUND OF THE DISCLOSURE

Field of the Disclosure

The present invention relates to a stereoscopic display device with a patterned retarder, and more particularly to a stereoscopic display device with a patterned retarder in which a brightness difference between a left eye image and a right eye image is compensated enabling to reduce a crosstalk, and a method for driving the same.

Discussion of the Related Art

The stereoscopic display device which displays a 3-dimensional (3D) image to have full of actuality has applications in many fields, such as medicine, education, movie, and television. The stereoscopic display device displays the left eye image and the right eye image separating the left eye image from the right eye image spatially or temporally for a watcher to perceive a 3D feeling owing to left and right parallactic images.

In methods for displaying the stereoscopic image, there are a glasses method in which a special glasses is used, and a non-glasses method in which no special glasses is used. In the glasses method, the left eye image and the right eye image are displayed on the display device changing polarization directions of the left eye image and the right eye image, or separating the left eye image form the right eye image by a time sharing method, for the watcher to perceive a 3D effect by using a polarizing glasses or a liquid crystal shutter glasses. In the non-glasses method, the stereoscopic image is displayed by using an optical plate, such as a lenticular sheet, or parallax barrier, mounted to a front or a rear of the display device.

The glasses type stereoscopic display device using the polarizing glasses displays the left eye image and the right eye image on a pixel matrix in horizontal pixel lines alternately, and converts the left eye image and the right eye image into a left-circular polarization image and a right-circular polarization image by using a patterned retarder attached to a front, respectively. The patterned retarder has a structure in which first and second polarization films which convert a linearly polarized light into a left-circular polarized light and a right-circular polarized light are arranged alternately in an up/down direction matched to left eye image lines (Odd lines) and right eye image lines (Even lines) arranged on the display device, alternately. The polarizing glasses makes spatial separation of the left eye image and the right eye image having polarization directions different from each other by using a left eye lens and a right eye lens which transmit the left-circular polarized light and the right-circular polarized light respectively for the user to perceive the 3D effect owing to left and right parallactic images.

In the display device which displays the left eye image and the right eye image in the horizontal pixel lines alternately, there has been a problem that a difference of overlap between a data line and pixels (i.e., a difference of parasitic capacitance) causes a difference of brightness between the odd line and the even line. The difference of overlap between the data line and pixels is caused, in a liquid crystal display device having data lines arranged in zigzag, by a difference of an overlap area between the data line of zigzag type and an upper side pixel, and an overlap area between the zigzag shaped data line and a lower side pixel.

Figure 1:
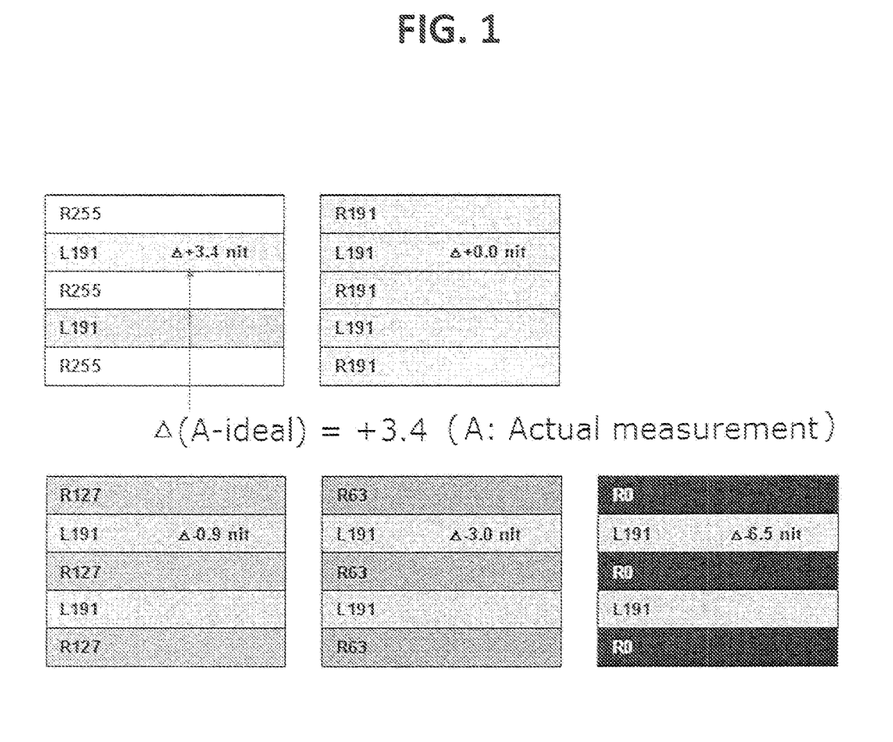
FIG. 1 illustrates a diagram showing variation of brightness of a left eye image with variation of a left eye image of the same gray scale in a related art stereoscopic display device.

Referring to FIG. 1, in the stereoscopic display device which displays the right eye image R and the left eye image L on the even lines and the odd lines respectively, in a case gray scales R255, R127, R63, R0 of the even image are varied while the gray scale R191 of the left eye image is fixed, the brightness of the left eye image lines varies in a range of +3.4~−6.5 nit due to interference of the right eye image lines, causing a brightness difference on the same gray scale.

The brightness difference between the odd line and the even line causes a brightness difference between the left eye image and the right eye image, increasing an extent of crosstalk between the left eye image and the right eye image.

SUMMARY OF THE DISCLOSURE

Accordingly, the present invention is directed to a stereoscopic display device, and a method for driving the same.

An object of the present invention is to provide a stereoscopic display device in which a brightness difference between a left eye image and a right eye image is compensated enabling to reduce a crosstalk, and a method for driving the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic display device includes a 3D formatter for aligning a left eye image data and a right eye image data received from an outside of the stereoscopic display device in an interlaced method and forwarding the same, a data compensating unit for selecting a compensation data on the left eye image data and the right eye image data received from the 3D formatter from a compensation look-up table having the compensating data on the left eye image data and the right eye image data on each gray scale preset thereon, and compensating the left eye image data and the right eye image data, and a panel driving unit for displaying the left eye image data and the right eye image data from the data compensating unit on a display unit alternately in lines.

The data compensating unit includes a memory for storing a first side data of the left eye image data and the right eye image data from the 3D formatter, the look-up table for selecting and forwarding the first side data from the memory and a compensation data on a second side, the other side, image data from the 3D formatter, and a arithmetic unit for compensating and forwarding the second side image data from the 3D formatter with the compensation data from the compensation look-up table.

In another aspect of the present invention, a method for driving a stereoscopic display device includes presetting compensation data matched to a left eye image data and a right eye image data on each gray scale for compensation of left eye image and a right eye image and storing the same in a compensation look-up table, selecting compensation data on the left eye image data and the right eye image data received from an outside of the stereoscopic display device from the compensation look-up table to compensate the left eye image data and the right eye image data received thus, and displaying the left eye image data and the right eye image data compensated thus on a display unit alternately in lines.

The compensating data includes storing a first side image data of the left eye image data and the right eye image data received thus in a memory, selecting and forwarding the first side data from the memory and a compensation data on a second side, the other side, image data received thus, and compensating and forwarding the second side image data received thus with the compensation data selected thus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 2:
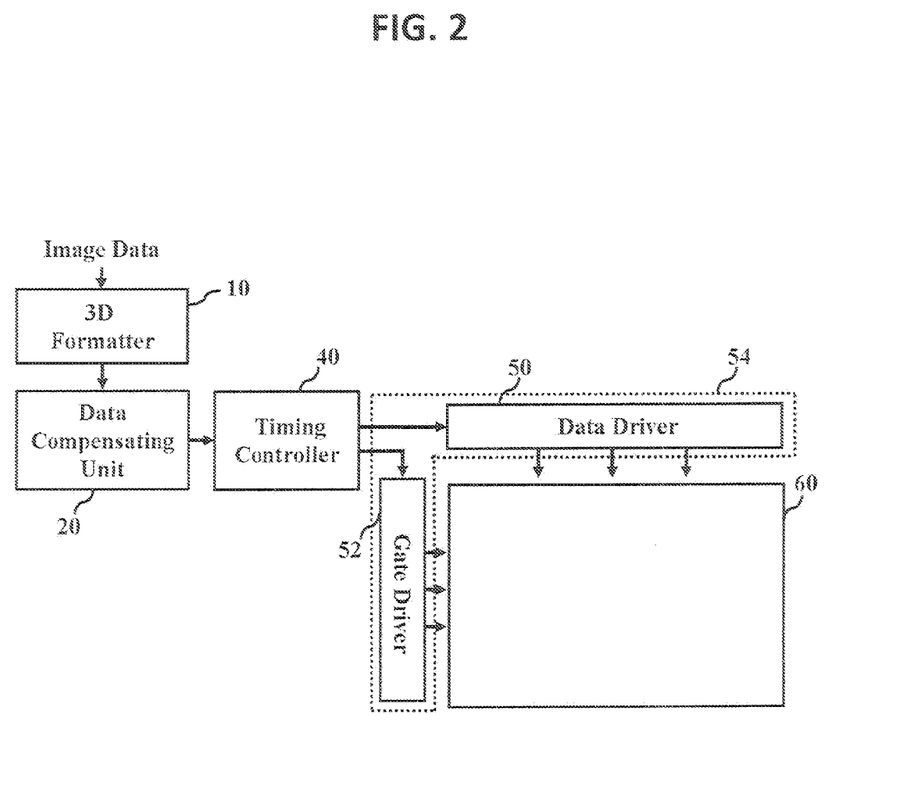
FIG. 2 illustrates a block diagram of a stereoscopic display device in accordance with a preferred embodiment of the present invention.

FIG. 2 illustrates a block diagram of a stereoscopic display device in accordance with a preferred embodiment of the present invention.

Referring to FIG. 2, the stereoscopic display device includes a 3D formatter 10, a data compensating unit 20, a timing controller 40, a panel driving unit 50 having a gate driver 52 and a data driver 54, and a display unit 60.

The 3D formatter 10 aligns an left eye image data and a right eye image data received from an outside of the stereoscopic display device by an interlaced method and forwards the same to the data compensating unit 20. The 3D formatter 10 aligns the left eye image data and the right eye image data to alternate in one horizontal synchronizing period 1H and forwards the same to the data compensating unit 20.

Figure 3:
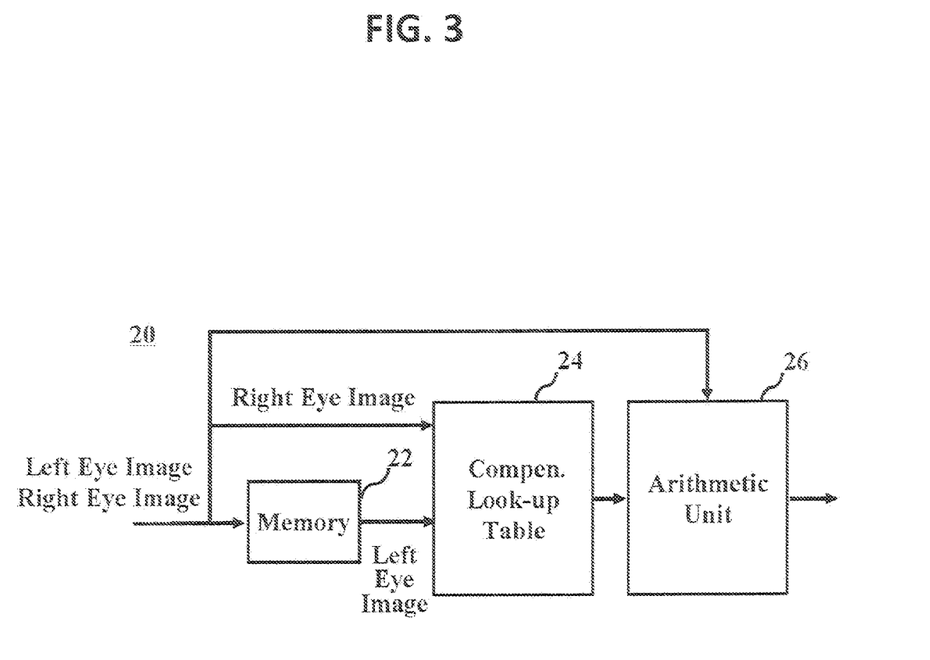
FIG. 3 illustrates a block diagram of the data compensating unit in FIG. 2.

The data compensating unit 20 compares the left eye image data and the right eye image data from the 3D formatter 10, selects a compensation data from a preset compensation look-up table, compensate the data for brightness with reference to the compensation data selected thus, and forwards the same to the timing controller 40. To do this, as shown in FIG. 3, the data compensating unit 20 includes a memory 22 for storing a left eye image data, a compensation look-up table 24 for comparing the left eye image data from the memory 22 to a right eye image data applied thereto to forward a relevant compensation data, and a arithmetic unit 26 for computing the left eye or the right eye image data applied thereto with the compensation data from the compensation look-up table 24 for compensating the input image data for the brightness.

The memory 22 stores the left eye or right eye image data from an input line and forwards the same. Hereinafter, the embodiment will be described taking a case in which the left eye image data is stored, as an example.

The compensation look-up table 24 has preset brightness difference compensation data on each gray scale stored therein by a designer matched to the left eye image data and the right eye image data. The designer measures brightness caused by interference between the even line and the odd line by using a measuring pattern on each gray scale, detects a brightness difference between actually measured brightness and ideal brightness, sets and stores the compensation data on each gray scale for compensating the brightness difference in advance. The compensation look-up table 24 compares the left eye image data from the memory 22 and the right eye image data from the input line, and selects and forwards the compensation data matched to the left and right eye image data, respectively.

The arithmetic unit 26 adds or subtracts the compensation data selected from the compensation look-up table 24 to/from the right eye image data or the left eye image data from the input line, for compensating the brightness difference between the left eye image and the right eye image.

The timing controller 40 aligns the image data from the data compensating unit 20 to suit to drive of the data driver 54 and forwards the same to the data driver 54. And, the timing controller 40 generates a data control signal for controlling driving timing of the data driver 54, and a gate control signal for controlling a driving timing of the gate driver 52, by using a plurality of synchronizing signals, i.e., a vertical synchronizing signal, a horizontal synchronizing signal, a data enable signal, and a dot clock signal supplied together with the image data from the data compensating unit 20, and forwards the data control signal and the gate control signal to the data driver 54 and the gate driver 52, respectively.

If the display unit 60 is a liquid crystal panel, the timing controller 40 can include a picture quality improving circuit, such as an over-driving circuit, for adding an overshoot value or an undershoot value to the data according to a data difference between adjacent frames to modulate the data for improving a response speed of the liquid crystals.

The panel driving unit 50 includes the gate driver 52 for driving the gate lines GL of the display panel 60 and the data lines of the display panel 60.

The gate driver 52 drives the gate lines of the display unit 60 in succession in response to the gate control signal from the timing controller 40.

The data driver 54 converts digital image data from the timing controller 40 into analog image signal by using a gamma voltage in response to the data control signal from the timing controller 40, and forwards the same to the data lines of the display unit 60.

Figure 4:
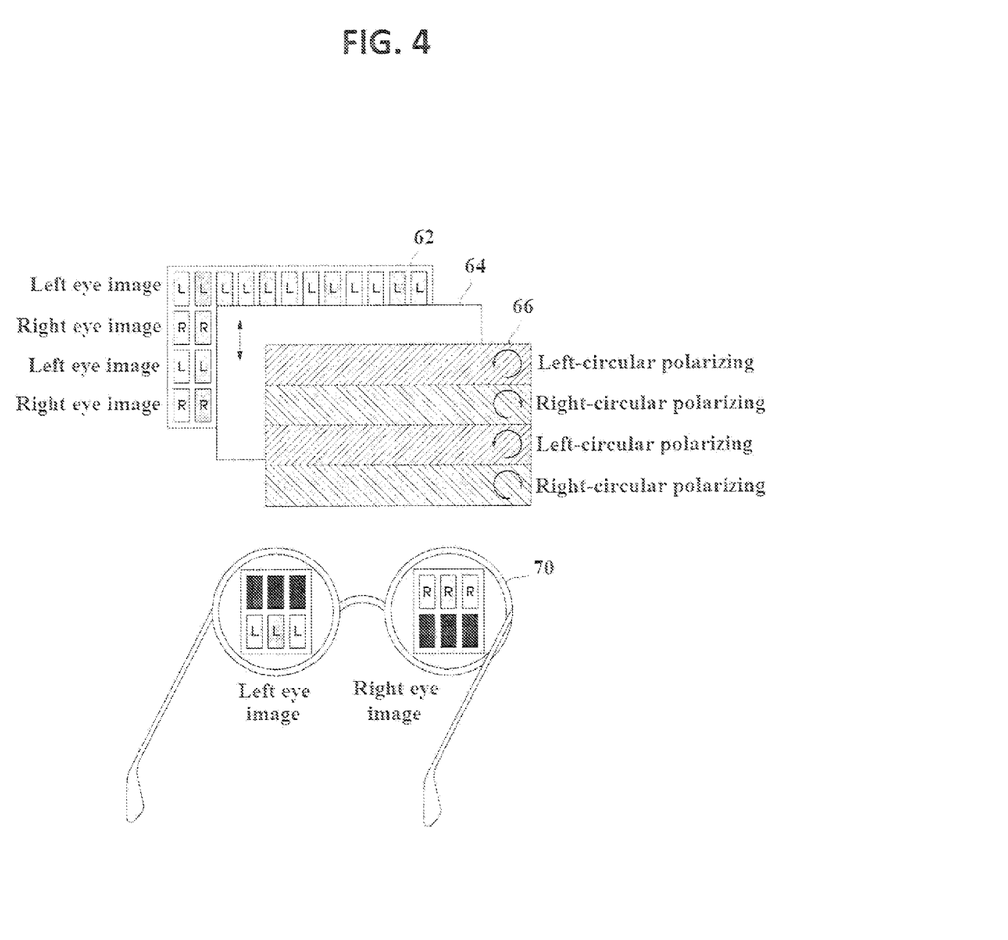
FIG. 4 illustrates an example of the display unit in FIG. 2.

The display unit 60 displays the left eye image and the right eye image on the display panel, and converts the left eye image and the right eye image into first and second circular-polarized images different from each other by using a patterned retarder attached to a front of the display panel, and forwards the same. To do this, as shown in FIG. 4, the display panel 60 includes a display panel 62, and an upper polarizing plate 64 and a patterned retarder 66 both attached to the front of the display panel 62.

As the display panel 62, one of various display panels, such as a liquid crystal display panel, an organic luminescence diode display panel, and a plasma display panel, can be applied. For an example, if the liquid crystal display panel is applied, the display panel 62 has a liquid crystal layer sealed between upper and lower substrates. The upper substrate has a color filter array formed thereon, and the lower substrate has a thin film transistor array formed thereon. The color filter array includes a black matrix and color filters. The thin film transistor array includes thin film transistors each connected to a gate line and a data line, and a pixel electrode connected to the thin film transistor. A common electrode for forming an electric field with the pixel electrode is formed on the color filter array or the thin film transistor array, additionally. Each of red, green, and blue sub-pixels produces a gray scale by adjusting a light transmissivity by driving the liquid crystal layer with a voltage difference between the pixel electrode and the common electrode. And, the display panel 62 has the upper polarizing plate 64, the lower polarizing plate (Not shown) respectively attached to outsides of the upper and lower substrates, and a backlight unit (Not shown) arranged on a rear of the liquid crystal panel 62, additionally. The upper polarizing plate and the lower polarizing plate have polarizing axes perpendicular to each other.

The display panel 62 displays the left eye image data L and the right eye image data R alternately in horizontal lines. That is, the display panel 62 displays the left eye image data L on odd lines and the right eye image data R on the even lines.

The upper polarizing plate 64 converts the left eye image data and the right eye image data displayed on the display panel 62 into linearly polarized images and forwards the same.

The patterned retarder 66 is a glass patterned retarder GPR having a glass substrate with a polarizing film attached thereto, or a film patterned retarder having a resin film with the polarizing film attached thereto. The patterned retarder 66 has a structure in which the first and second polarizing films having polarizing axes different from each other arranged alternately matched to the left eye image lines (odd lines) and the right eye image lines (even lines) on the display panel 62. The first and second polarizing films delay phases of the linearly polarized light from the upper polarizing plate 62 by ¼ wavelengths to convert the linearly polarized light into a left-circular light and a right-circular light by using polarizing axes of the first and second polarizing films having relations of ±45° with respect to the polarizing axis of the upper polarizing plate, respectively. For an example, in the patterned retarder 66, the first polarizing film matched to the left eye image line (Odd line) of the display panel 62 converts the linearly polarized light of the left eye image into a left-circular polarizing light and the second polarizing film matched to the right image line (Even line) of the display panel 62 converts the linearly polarized light of the right eye image into a right-circular polarizing light.

The polarizing glasses 70 the watcher wears has a left eye lens and a right eye lens having polarizing axes different from each other. For an example, as the left eye lens transmits the left eye image converted into the left-circular light by the patterned retarder 66, and the right eye lens transmits the right eye image converted into the right-circular light by the patterned retarder 66, the polarizing glasses 70 separates the left eye image from the right eye image, spatially. According to this, the watcher perceives the stereoscopic image owing to the left and right parallactic images separated into left and right spaces.

Thus, by reducing the brightness difference between the left eye image and the right eye image with the data (brightness difference) compensation of the data compensating unit 20 described before, the stereoscopic display device of the present invention can reduce an extent of the crosstalk between the left eye image and the right eye image.

FIGS. 5A and 5B, and FIGS. 6A and 6B illustrate comparative tables and graphs for comparing a crosstalk of a right eye image to a left eye image at stereoscopic display devices of the related art and the present invention, respectively.

Figure 5A:
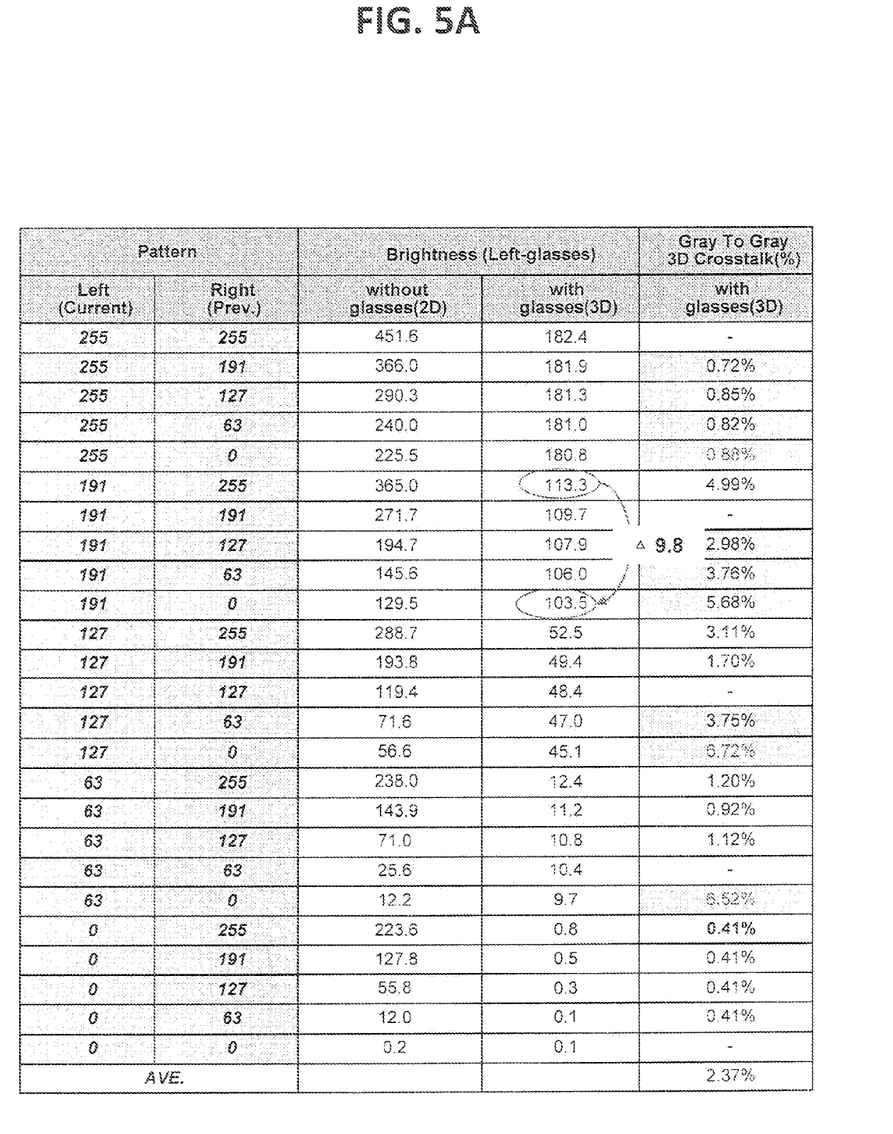
FIGS. 5A and 5B illustrate comparative tables for comparing a crosstalk of a right eye image to a left eye image measured at stereoscopic display devices of the related art and the present invention, respectively.
Figure 5B:
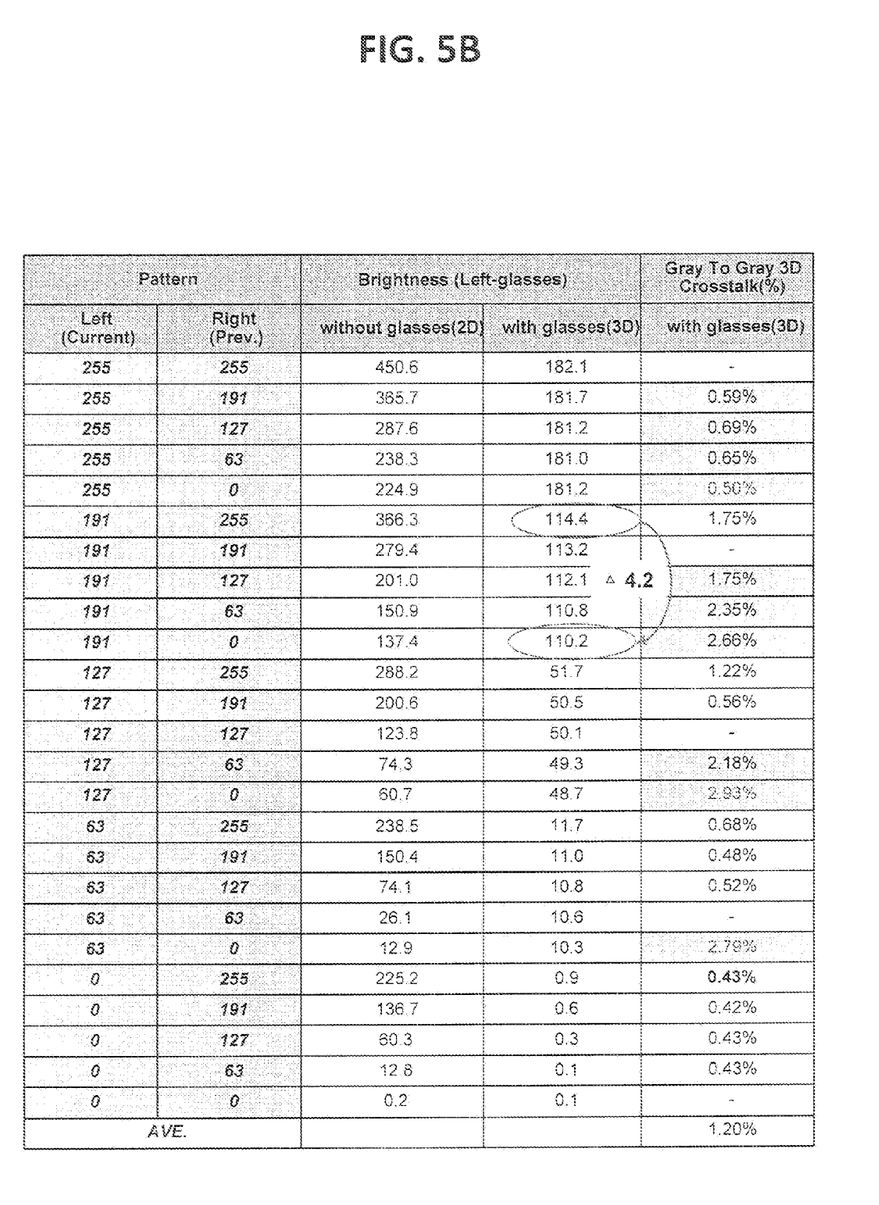

FIG. 5A illustrates a table showing measurements of brightness and crosstalks through the left side glasses while displaying the left eye image and the right eye image of each gray scale by using measurement pattern having 5 gray scales of 0, 63, 127, 191, and 255 on the related art stereoscopic display device, and FIG. 5B illustrates a table showing measurements of brightness and crosstalks through the left side glasses while displaying the left eye image and the right eye image of each gray scale by using measurement pattern having 5 gray scales of 0, 63, 127, 191, and 255 on the stereoscopic display device of the present invention.

Referring to FIGS. 5A and 5B, in a case a 255 gray scale and 0 gray scale of the right eye images are respectively displayed for 191 gray scales of the left eye images, it can be known that the brightness difference Δ42 of the gray scales measured at the stereoscopic display device of the present invention is smaller than the brightness difference Δ9.8 of the gray scales measured at the stereoscopic display device of the related art. Eventually, it can be known that the crosstalk of the right eye image to the left eye image measured at the liquid crystal display panel of the present invention is smaller than the crosstalk measured at the related art stereoscopic display device.

Figure 6A:
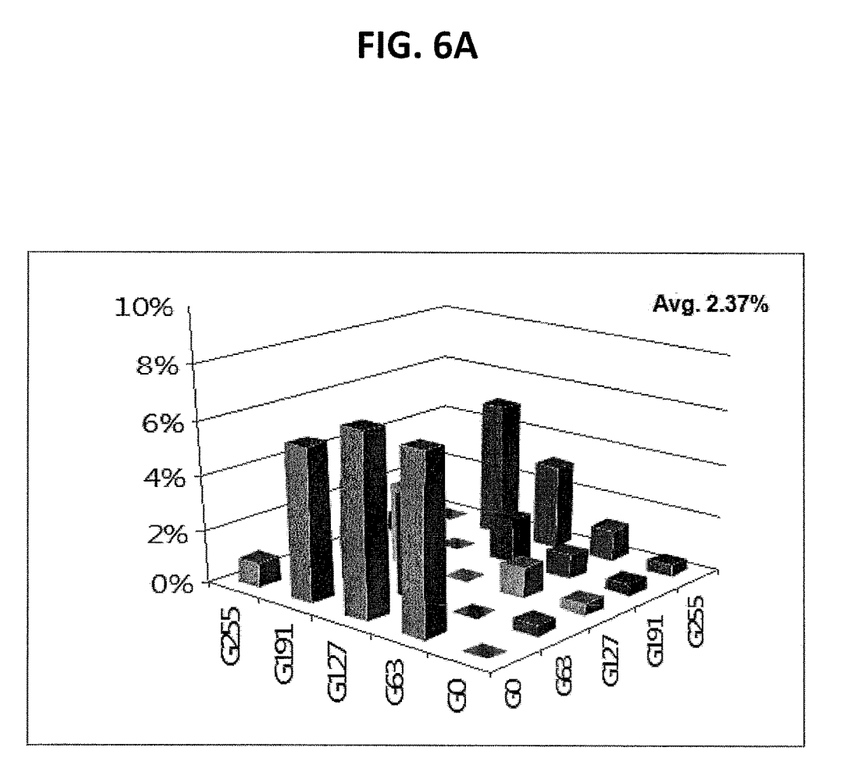
FIGS. 6A and 6B illustrate comparative graphs for comparing a crosstalk of a right eye image to a left eye image measured at stereoscopic display devices of the related art and the present invention, respectively.
Figure 6B:
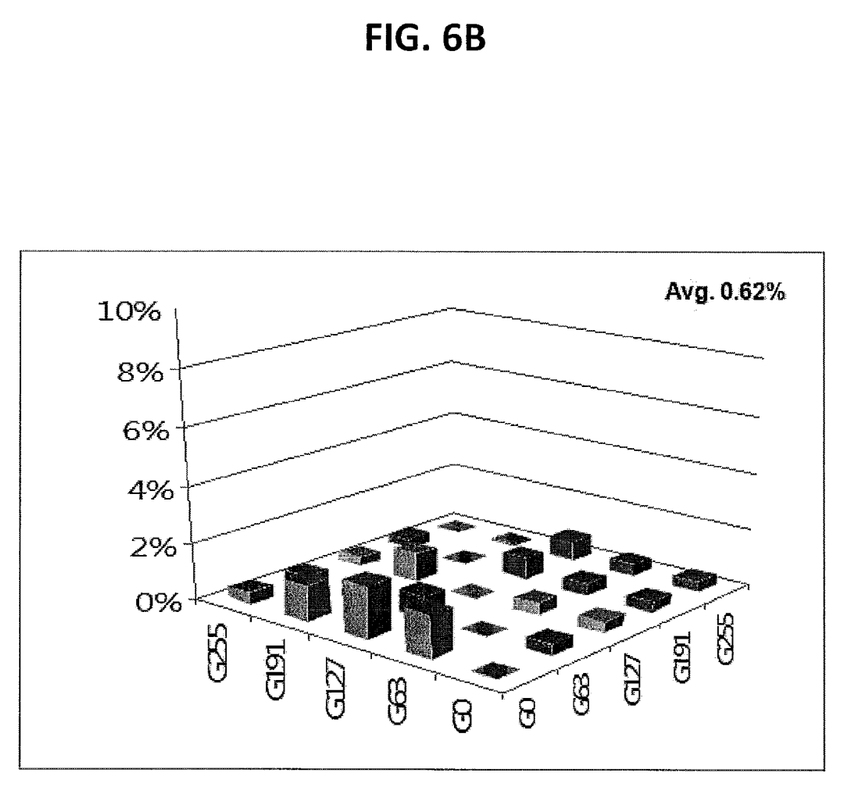

Referring to FIGS. 6A and 6B, it can be known that an average 2.37% of the crosstalk measured at the liquid crystal display panel of the present invention is smaller than the crosstalk measured at the related art stereoscopic display device.

As has been described, the stereoscopic display device and the method for controlling the same of the present invention have the following advantages.

Thus, by selecting a relevant compensation data from a preset compensation look-up table with comparison of the left eye image data and the right eye image data and compensating the left eye image data or the right eye image data with the compensation data selected thus, the stereoscopic display device and the method for controlling the same of the present invention can compensate the brightness difference between the gray scales of the left eye image and a right eye image, enabling to reduce the crosstalk between left eye image and a right eye image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic display device comprising:
    a 3D formatter for aligning a left eye image data and a right eye image data received from an outside of the 3D formatter in an interlaced method and forwarding the same;
    a data compensating unit configured to:
    compare the left eye image data with the right eye image data received from the 3D formatter, the left eye image data and the right eye image data to be displayed simultaneously in the interlaced method, and
    select compensation data, matched to both the left eye image data and the right eye image data, from a compensation look-up table having the compensation data on the left eye image data and the right eye image data on each gray scale preset thereon, and
    compensate the left eye image data or the right eye image data using the selected compensation data, wherein the compensation data includes a first preset gray scale adjustment value for the left eye image data or a second preset gray scale adjustment value for the right eye image data; and
    a panel driving unit configured to display the left eye image data and the right eye image data from the data compensating unit simultaneously on a display unit alternately in lines,
    wherein:
    the compensation data is to compensate for a brightness difference on each gray scale caused by interference between the left eye image data in a left eye line to be displayed simultaneously with and adjacent to the right eye image data in a right eye line, and the left eye line and the right eye line are alternately arranged and simultaneously displayed on the display unit, and
    the data compensating unit adds or subtracts the selected compensation data to or from the left eye image data or the right eye image data received from the 3D formatter to compensate for the brightness difference between the left eye image data of the left eye line and the right eye image data of the right eye line.

2. The stereoscopic display device as claimed in claim 1, wherein the data compensating unit includes:
    a memory for storing a first side image data of the left eye image data and the right eye image data from the 3D formatter,
    the look-up table for selecting the compensation data matched to the first side data from the memory and a second side image data of the left eye image data and the right eye image data from the 3D formatter, and forwarding the selected compensation data, and
    an arithmetic unit for compensating for the second side image data from the 3D formatter by adding or subtracting the selected compensation data to or from the second side image data, and forwarding the compensated second side image data.

3. A method for driving a stereoscopic display device, the method comprising:
    presetting compensation data matched to a left eye image data set and a right eye image data set on each gray scale for compensation of a left eye image and a right eye image and storing the same in a compensation look-up table;
    comparing left eye image data with right eye image data, the left eye image data and the right eye image data to be displayed simultaneously in an interlaced method;
    selecting compensation data matched to both the left eye image data and the right eye image data from the compensation look-up table to compensate the left eye image data or the right eye image data using the selected compensation data, wherein the compensation data includes a first preset gray scale adjustment value for the left eye image data or a second preset gray scale adjustment value for the right eye image data; and
    displaying the compensated left eye image data and the right eye image data simultaneously on a display unit alternately in lines,
    wherein:
    the compensation data is to compensate for a brightness difference on each gray scale caused by interference between the left eye image in a left eye line to be displayed simultaneously with and adjacent to the right eye image in a right eye line, and the left eye line and the right eye line are alternately arranged and simultaneously displayed on the display unit, and
    the selected compensation data is added or subtracted to or from the left eye image data or the right eye image data to compensate for the brightness difference between the left eye image of the left eye line and the right eye image of the right eye line.

4. The method as claimed in claim 3, wherein the selecting the compensation data includes:
    storing a first side image data of the left eye image data and the right eye image data in a memory,
    selecting the compensation data matched to the first side data from the memory and a second side image data of the left eye image data and the right eye image data, and forwarding the selected compensation data, and
    compensating for the second side image data by adding or subtracting the selected compensation data to or from the second side image data, and forwarding the compensated second side image data.

* * * * *